United States Patent
Lin et al.

(10) Patent No.: US 11,705,833 B2
(45) Date of Patent: Jul. 18, 2023

(54) MOTOR CONTROLLER, MOTOR CONTROL METHOD AND COMPUTER PROGRAM PRODUCT FOR VEHICLE ASSIST CONTROL

(71) Applicant: CHROMA ATE INC., Taoyuan (TW)

(72) Inventors: Yu-Ting Lin, Taoyuan (TW); Cheng-Tsung Lin, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 0 days.

(21) Appl. No.: 17/697,978

(22) Filed: Mar. 18, 2022

(65) Prior Publication Data
US 2022/0311363 A1  Sep. 29, 2022

(30) Foreign Application Priority Data
Mar. 23, 2021 (TW) ................... 110110342

(51) Int. Cl.
| | |
|---|---|
| H02P 21/22 | (2016.01) |
| H02P 6/08 | (2016.01) |
| H02P 25/026 | (2016.01) |
| H02P 9/00 | (2006.01) |

(52) U.S. Cl.
CPC ............. *H02P 6/08* (2013.01); *H02P 9/009* (2013.01); *H02P 25/026* (2013.01)

(58) Field of Classification Search
CPC .......... H02P 6/08; H02P 25/026; H02P 9/009; B60L 15/2018; B60L 2240/421; B60L 2240/423; B60L 2260/44; G05B 11/42
See application file for complete search history.

(56) References Cited

U.S. PATENT DOCUMENTS

| | | | | |
|---|---|---|---|---|
| 8,593,087 B2 * | 11/2013 | Terada | ............... | H02P 21/22 |
| | | | | 318/700 |
| 2007/0296368 A1 * | 12/2007 | Woodland | ............ | G05B 11/42 |
| | | | | 318/609 |

* cited by examiner

*Primary Examiner* — Cortez M Cook
(74) *Attorney, Agent, or Firm* — WPAT, P.C

(57) ABSTRACT

The present application discloses a motor controller, a motor control method and a computer program product for vehicle assist control. An assist torque command for a motor device to perform vehicle assist control is generated according to an execution command of a vehicle assist determination unit and a rotor position signal and a rotor speed signal of a motor device. An original position signal of the motor device and the rotor position signal are calculated, and a position ratio calculation is performed to generate a front-order torque command. A torque damping command is generated according to the speed ratio calculation based on the rotor speed signal, and is calculated with the front-order torque command to generate an assist torque command. Thus, position information of the rotor of the motor device can be directly used in the calculation and speed information is at the same time used for an assist calculation, thereby preventing an error and solving the issue of sliding during parking.

7 Claims, 2 Drawing Sheets

MOTOR CONTROLLER, MOTOR CONTROL METHOD AND COMPUTER PROGRAM PRODUCT FOR VEHICLE ASSIST CONTROL

BACKGROUND OF THE INVENTION

Field of the Invention

The present invention relates to a motor controller, a motor control method and a computer program product, and more particularly to a motor controller, a motor control method and a computer program product for vehicle assist control.

Description of the Prior Art

Electric vehicles or hybrid vehicles powered by both gasoline and electricity use a motor as a whole or partial power source, and the motor is controlled to operate in an expected mode through an electronic management function, thereby providing the vehicles with corresponding control.

For example, a ramp parking function of a vehicle is usually enabled when a user uses a brake after the user stops a vehicle on a ramp. As the behavior of braking performed by the user terminates, the ramp parking function allows the vehicle to remain on the ramp without sliding downward, and the ramp parking function is released only when a certain condition is satisfied.

However, a controller may not be able to provide a motor with correct control if current dynamic conditions of the vehicle are not accurately learned, and a corresponding control function may easily fail or other additional detection elements or high-order detection elements are required for assist determination, leading to increased costs.

SUMMARY OF THE INVENTION

It is an object of the present invention to allow a controller to learn current dynamic conditions of a vehicle.

It is another object of the present invention to enhance stability of vehicle assist control.

To achieve the above and other objects, the present invention provides a motor controller for vehicle assist control. An assist torque command for a motor device to perform vehicle assist control is generated according to an execution command of a vehicle assist determination unit as well as a rotor position signal and a rotor speed signal of the motor device. The motor controller includes a first consolidation unit, a second consolidation unit, a first gain unit and a second gain unit. The first consolidation unit generates a position offset signal according to an original position signal and the rotor position signal of the motor device. The first gain unit performs a position ratio calculation based on the position offset signal to generate a front-order torque command. The second gain unit performs a speed ratio calculation based on the rotor speed signal to generate a torque damping command. The second consolidation unit generates the assist torque command according to the front-order torque command and the torque damping command used as negative feedback.

In one embodiment of the present invention, the motor controller includes a threshold limiting unit. The threshold limiting unit generates a speed adjustment signal according to a speed threshold and the rotor speed signal. The speed adjustment signal is adapted to be input to the second gain unit for performing the speed ratio calculation so as to generate the torque damping command. When the rotor speed signal is positive, the threshold limiting unit can be used to set the speed adjustment signal to zero when the rotor speed signal is smaller than the speed threshold, and to correspond the speed adjustment signal to the rotor speed signal when the rotor speed signal is greater than the speed threshold. When the rotor speed signal is negative, the threshold limiting unit can be used to set the speed adjustment signal to zero when the rotor speed signal is greater than the speed threshold in negative, and to correspond the speed adjustment signal to the rotor speed signal when the rotor speed signal is smaller than the speed threshold in negative.

In one embodiment of the present invention, the first consolidation unit is adapted to define the rotor position signal currently received as the original position signal upon receiving the execution command, and to define an offset between the original position signal and the rotor position signal subsequently received as the position offset signal.

To achieve the above and other objects, the present invention provides a motor control method for vehicle assist control, for a motor device to perform vehicle assist control according to a rotor position information and a rotor speed signal of the motor device. The motor control method includes: generating a position offset signal according to an original position signal and the rotor position signal of the motor device in response to an execution command issued by a vehicle assist determination unit; performing a position ratio calculation based on the position offset signal to generate a front-order torque command; performing a speed ratio calculation based on the rotor speed signal to generate a torque damping command; and generating an assist torque command according to the front-order torque command and the torque damping command used as negative feedback, wherein the assist torque command is provided to the motor device for performing vehicle assist control.

In one embodiment of the present invention, in the step of generating the torque damping command, a speed adjustment signal is generated according to a speed threshold and the rotor speed signal, wherein the speed adjustment signal is for performing a speed ratio calculation to generate the torque damping command. When an absolute value of the rotor speed signal is smaller than the speed threshold, the speed adjustment signal is defined as zero; when the absolute value of the rotor speed signal is greater than the speed threshold, the speed adjustment signal is defined as the rotor speed signal.

In one embodiment of the present invention, in the step of generating the position offset signal, the rotor position signal currently received can be defined as the original position signal upon receiving the execution command, and an offset between the original position signal and the rotor position signal subsequently received can be defined as the position offset signal.

To achieve the above and other objects, the present invention provides a computer program product for storing therein a computer program for controlling a motor device to perform assist control of a vehicle parking on a ramp. When the computer program is loaded by a computer, the motor control method for vehicle assist control above can be implemented according to an execution command of a vehicle assist determination unit and a rotor position signal and a rotor speed signal of the motor device.

Accordingly, position information of the rotor of the motor device can be directly used in the calculation and speed information is at the same time used for an assist calculation, thereby preventing an error generated by a calculation purely based on the speed information and solving the issue of sliding during parking.

DETAILED DESCRIPTION OF THE EMBODIMENTS

To better understand the objects, features and effects of the present invention, embodiments are given with the accompanying drawings below to further describe details of the present invention.

Singular quantitative expressions, such as "a", "an" and "one", which precede terms used hereinafter, such as units, components, structures, devices, modules, system, region or zone, are not only intended to facilitate explanations but also provide general meanings to the scope of the present disclosure. Therefore, unless otherwise specified obviously, the aforesaid singular quantitative expressions must be interpreted to mean "comprises one or at least one" and include plurals.

Expressions, such as "comprise", "include", "have" and the like, used herein are not limited to essential components of the present disclosure but include any other essential components not definitely disclosed by the present disclosure, yet they are usually intrinsic to the units, components, structures, devices, modules, system, region, zone, or other component usually inherent in the module.

Ordinal numbers, such as "first" and "second," used herein are intended to distinguish or correlate identical or similar components or structures and do not necessarily imply what order the units, components, structures, devices, modules, system, region or zone are in in terms of space. It is understood that in some situations or arrangements, the ordinal numbers may be swapped without affecting the effects of implementation of the present disclosure.

Motor devices are commonly used as power sources, and an electrically driven motor device can perform an angle detection on a rotor of a motor by means of an encoder, so as to feedback position information of the rotor of the motor and allow a control end to learn operation conditions of the motor. Moreover, the control end can further learn rotational speed information of the motor by further performing a differential operation on a variance of the position information.

In a vehicle using an electrically driven motor device, whether a motorbike or an automobile, various control function modules of a controller can control the motor device, further adjusting a power output status of the vehicle to implement a corresponding function. For example, when a vehicle is in a forward or reverse gear, further adjustment control can be performed on the motor to directly perform assist control on the power output of the vehicle. For example, when a vehicle is parked on a ramp, the torque of the motor may be controlled to further generate a force of tires against the ground in order to prevent the vehicle from sliding downward.

Figure 1:
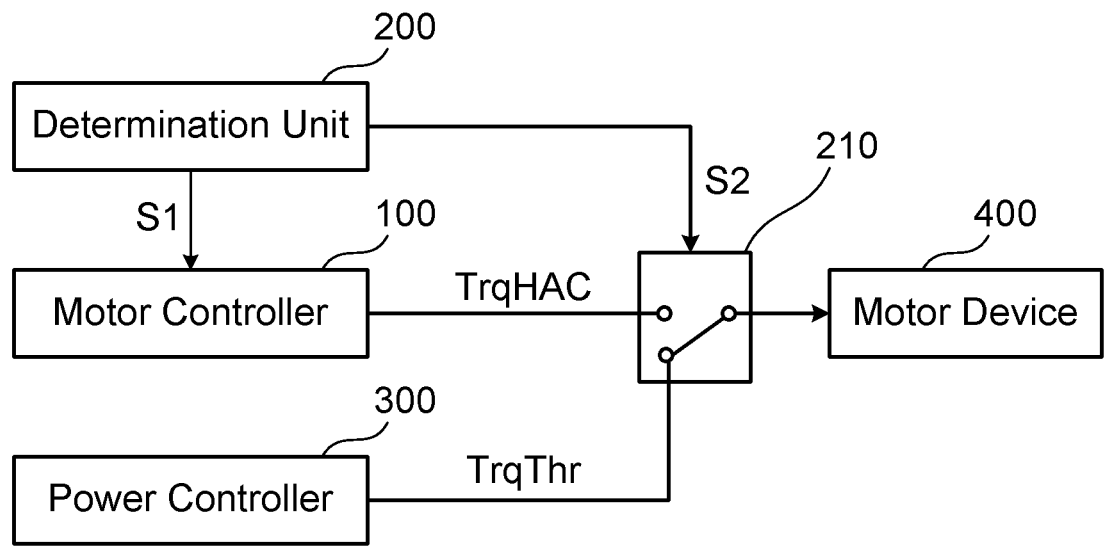
FIG. 1 is a structural schematic diagram of vehicle assist control according to an embodiment of the present invention.

Refer to FIG. 1 showing a structural schematic diagram of vehicle assist control according to an embodiment of the present invention. A motor controller 100 may include a vehicle assist control module for providing a ramp parking function in a control system. With a loop design of an automatic control system, vehicle assist control is achieved to prevent a downslide of the vehicle in a ramp parking mode. A determination unit 200 selectively provides an execution command S1 to the motor controller 100, so that the motor controller 100 that receives the execution command S1 outputs an assist torque command TrqHAC. Meanwhile, the determination unit 200 provides a switching command S2 to a switcher 210, so that the motor device 400 can switch from receiving a throttle torque command TrqThr under a user operation to receiving the assist torque command TrqHAC output by the motor controller 100. FIG. 1 depicts a situation where a motor device 400 receives the throttle control command TrqThr.

The throttle torque command TrqThr is generated by a power controller 300 according to related user operation information input. The throttle torque command TrqThr may be a set of throttle control information, gear control information and brake actuation information. For example, when a user uses the brake, the throttle control information and the gear control information can be blocked, and the throttle control command TrqThr does not include an instruction for the motor device to provide the vehicle with power, further allowing the brake to fully practice the function of reducing the vehicle speed.

The determination unit 200 is a function module in the control system, and various types of vehicle status information and user control information provided to the control system allow the determination unit 200 to perform control of corresponding functions. The control system may include a vehicle micro-control unit (MCU), which includes the motor controller 100, the determination unit 200, the power controller 300 and the switcher 210. Taking the function of ramp parking for instance, the ramp parking function is usually activated when the vehicle is stationary and the user does not use the throttle or release the brake. Moreover, the ramp parking function is usually released after the user uses the throttle that exceeds a downslide force, or is automatically released after ramp parking for a predetermined time. The timing of using the ramp parking function can be defined according to different actual conditions required. The determination unit 200 accordingly generates the execution command S1 to the motor controller 100 and generates the switching command S2 to the switcher 210, enabling the motor device 400 to provide a corresponding torque so as to withstand the downslide force of the vehicle.

Figure 2:
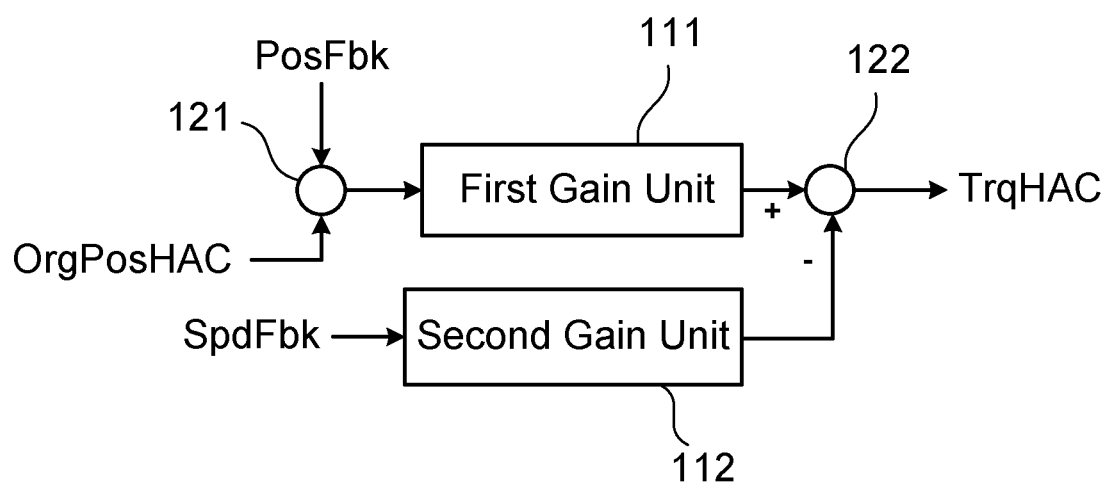
FIG. 2 is a block diagram of a control system of a motor controller according to an embodiment of the present invention.

Referring to both FIG. 1 and FIG. 2, FIG. 2 shows a block diagram of a control system of a motor controller according to an embodiment of the present invention. The motor controller 100 shown as an example in FIG. 1 includes, in the embodiment in FIG. 2, a first consolidation unit 121, a second consolidation unit 122, a first gain unit 111 and a second gain unit 112. Upon receiving the execution command S1, the motor controller 100 starts operating the first consolidation unit 121, the second consolidation unit 122, the first gain unit 111 and the second gain unit 112. The consolidation units perform calculations in the control system, for example, subtraction for subtracting with a signal used as negative feedback, or addition for adding with a signal used as positive feedback. The gain units in this embodiment perform a proportional calculation in the control system, and one characteristic thereof is to amplify an error by a multiple (gain value Kp) as an operation amount so as to serve as one P controller.

The gain value may be defined as being used for reducing the error, and is usually adjusted according to the target of the gain. For example, the gain value of the first gain unit 111 may be determined according to the length of a converging time of the position offset signal to be achieved, and the gain value of the first gain unit 111 increases as the converging time of the position offset signal needed gets shorter. On the other hand, the gain value of the second gain unit 112 may be determined according to the length of a converging time of the speed offset signal to be achieved, and the gain value of the second gain unit 112 increases as the converging time of the speed offset signal needed gets shorter.

The first consolidation unit 121 performs a calculation according to the rotor position information fed back by the motor device 400 shown in FIG. 1 to generate the position offset signal to be provided to the first gain unit 111. The first consolidation unit 121 performs a subtraction calculation on an original position signal OrgPosHAC and the rotor position signal PosFbk received. For example, one between the original position signal OrgPosHAC and the rotor position signal PosFbk is used as negative feedback, e.g., the rotor position information PosFbk may be calculated by means of negative feedback, or the original position signal OrgPosHAC is calculated by means of negative feedback.

The original position signal OrgPosHAC is a basic value for the calculation and is for the first consolidation unit 121 to calculate an offset between the current motor rotor position and the basic value, wherein the offset represents an indicator indicating a downslide level of the vehicle. Preferably, upon receiving the execution command S1, the first consolidation unit 121 defines the rotor position signal currently received fed back by the motor device as the original position signal OrgPosHAC, and defines the offset between the original position signal OrgPosHAC and the rotor position signal PosFbk subsequently received as the position offset signal that is provided to the first gain unit 111.

The first gain unit 111 performs a position ratio calculation according to the position offset signal received to generate a front-order torque command that is provided to the second consolidation unit 122. The second gain unit 112 performs a speed ratio calculation based on the rotor speed signal SpdFbk fed back by the motor device to generate a torque damping command that is provided to the second consolidation unit 122.

The second consolidation unit 122 performs a subtraction operation according to the front-order torque command and the torque damping command to generate an assist torque command TrqHAC, wherein the torque damping command is calculated by means of negative feedback so that the front-order torque command is subtracted by the torque damping command to generate the assist torque command TrqHAC. Thus, the motor controller 100 can directly generate the corresponding front-order torque command according to a position variance difference (for determining whether a downslide occurs and a downslide level) of the rotor in the motor device 400, so as to generate an indication of whether the motor device outputs a torque opposite to the forward direction of the vehicle (resistance to the downslide) and an output size of the control torque (the torques gets larger as the downslide level increases). Thus, the direct use of the rotor position signal PosFbk also prevents an error resulted in the speed signal calculated based on the position signal.

Since the resolution of the encoder in the motor device 400 also contains certain errors due to different quality levels, the resolution of the encoder cannot be enhanced under the restriction of certain cost concerns. Thus, assuming that the occurrence of a downslide of a vehicle is determined on the basis of a speed signal of a rotor, since a minimum rotational speed exists in the calculation of speed feedback when an encoder with a low resolution is used, it may be determined that no downslide occurs when a rotational speed is lower than this minimum rotational speed. As a result, a vehicle sliding slowly may not be timely and effectively determined and an error is then generated in the speed feedback, such that the vehicle generates a slow movement to a certain extent or a continuous slow movement.

In the block of the control system in FIG. 2, the torque damping command based on the rotor speed signal SpdFbk is further generated in the second gain unit 112, wherein the command is for the motor device 400 to make further adjustment during torque output. The torque damping command can provide an output torque of the motor device 400 with fine-tuning in response to a current downslide speed (based on the speed of the rotor) of the vehicle. For example, status information of the rotor speed signal SpdFbk can be provided to the second gain unit 112. Thus, when the motor device 400 is to output a torque to prevent the downslide of the vehicle, the rotor speed signal SpdFbk may be used to coordinate with the output size of the torque. When the downslide speed is fast, the speed of the rotor is high, and the torque damping command causes the assist torque command TrqHAC generated by the second consolidation unit 122 to have the motor device 400 generate a larger torque resisting the downslide, or conversely, a smaller torque resisting the downslide is generated. The downslide speed refers to a calculation element in a microscopic aspect of the control system, but does not refer to a downslide actually sensed by the user.

Figure 3:
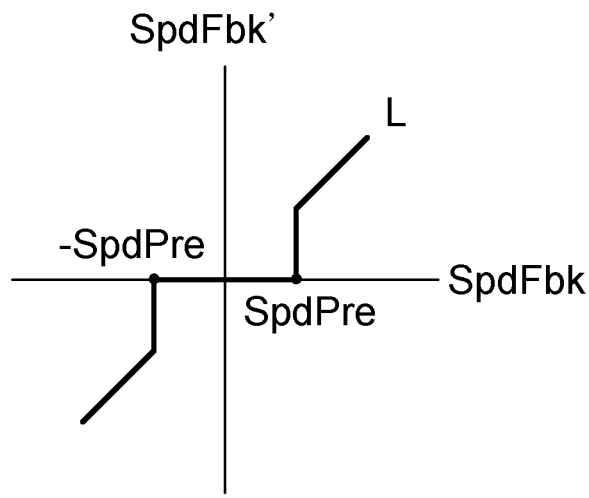
FIG. 3 is a relationship diagram of a rotor speed signal SpdFbk and a speed adjustment signal SpdFbk'.
Figure 4:
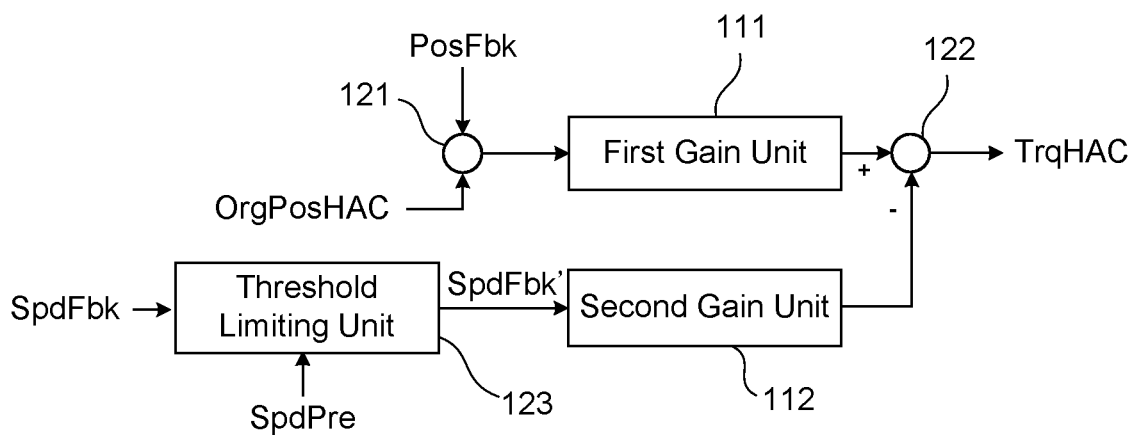
FIG. 4 is a block diagram of a control system of a motor controller according to another embodiment of the present invention.

Referring to both FIG. 1 and FIG. 3, FIG. 3 shows a block diagram of a control system of a motor control device according to another embodiment of the present invention. The motor controller 100 shown as an example in FIG. 1 includes, in the embodiment in FIG. 3, a first consolidation unit 121, a second consolidation unit 122, a first gain unit 111, a second gain unit 112 and a threshold limiting unit 123.

The threshold limiting unit 123 performs a zero speed processing procedure according to a predetermined speed threshold SpdPre and the received rotor speed signal SpdFbk to generate a speed adjustment signal SpdFbk' that is input to the second gain unit 112. Refer to FIG. 3 showing a relationship diagram of the rotor speed signal SpdFbk and the speed adjustment signal SpdFbk'. A relationship of the speed threshold SpdPre, the rotor speed signal SpdFbk and the speed adjustment signal SpdFbk' generated after the zero speed processing procedure is shown in FIG. 3. In FIG. 3, the signal value of the speed adjustment signal SpdFbk' is the vertical axis, the signal value of the rotor speed signal SpdFbk is the horizontal axis, and L is a determination curve in the zero speed processing procedure for determining the signal value of the speed adjustment signal SpdFbk'.

When the rotor speed signal SpdFbk received by the threshold limiting unit 123 is positive (for example, when one of the clockwise rotation and the counterclockwise rotation of the rotor is defined as positive), the determination result occurs in the first quadrant in FIG. 3. Whether the rotor speed signal SpdFbk is positive or negative is associated with the rotation direction of the rotor. Moreover, when the rotor speed signal SpdFbk is smaller than the speed threshold SpdPre, the speed adjustment signal SpdFbk' is regarded as zero; conversely, when the rotor speed signal SpdFbk is greater than the speed threshold SpdPre, the speed adjustment signal SpdFbk' corresponds to the current rotor speed signal SpdFbk.

On the other hand, when the rotor speed signal SpdFbk received by the threshold limiting unit 123 is negative, the determination result occurs in the third quadrant in FIG. 3. Moreover, when the rotor speed signal SpdFbk is greater than a negative speed threshold −SpdPre, the speed adjustment signal SpdFbk' is regarded as zero; conversely, when the rotor speed signal SpdFbk is smaller than the negative speed threshold −SpdPre, the speed adjustment signal SpdFbk' corresponds to the current rotor speed signal SpdFbk. In other words, when an absolute value of the rotor speed signal SpdFbk is smaller than the speed threshold SpdPre, the speed adjustment signal SpdFbk' is defined as zero; conversely, when the absolute value of the rotor speed signal SpdFbk is greater than the speed threshold SpdPre, the speed adjustment signal SpdFbk' corresponds to the rotor speed signal SpdFbk.

The speed adjustment signal SpdFbk' is for performing the speed ratio calculation so as to generate the torque damping command that is input to the second consolidation unit 122. The predetermined speed threshold SpdPre is set to be a lowest detectable speed. As shown in FIG. 3, for example, when the clockwise rotation of the rotor is defined as positive and under the clockwise rotation, the state is regarded as zero-speed stationary if the rotor speed signal SpdFbk is lower than the speed threshold SpdPre. Accordingly, a coordination level of the torque damping command with respect to the output torque of the motor device 400 can be defined.

Referring to FIG. 1 to FIG. 4, FIG. 4 shows a block diagram of a control system of a motor controller according to another embodiment of the present invention. In summary, the motor control method for vehicle assist control can respond to the execution command S1 issued by the vehicle assist determination unit, so as to generate a position offset signal according to the original position signal OrgPosHAC of the motor device 400 and the rotor position signal PosFbk used as negative feedback. A position ratio calculation is then performed based on the position offset signal to generate a front-order torque command. Moreover, a speed ratio calculation is at the same time performed based on the rotor speed signal SpdFbk to generate a torque damping command. Next, an assist torque command TraHAC that is provided to the motor device 400 is generated according to the front-order torque command and the torque damping command used as negative feedback (a subtraction operation is performed on the front-order torque command and the torque damping command), for the motor device 400 to perform vehicle assist control.

Accordingly, in a vehicle control system, a computer program product for controlling a motor device to perform assist control of a vehicle parking on a ramp is stored therein. When the computer program (for example, firmware) is loaded by a computer, the motor control method for vehicle assist control above can be implemented according to the execution command S1 of the vehicle assist determination unit 200 and the rotor position signal PosFbk and the rotor speed signal SpdFbk of the motor device 400, thereby accurately learning the current dynamic conditions of the vehicle and enhancing stability of the vehicle assist control.

In conclusion, position information of the rotor of the motor device can be directly used in the calculation and speed information is at the same time used for an assist calculation, thereby preventing an error and solving the issue of sliding during parking.

While the invention has been described by way of example and in terms of the preferred embodiments, one person skilled in the art can understand that the embodiments are for explaining the present invention, but are not to be construed as limitations to the present invention. It is to be noted that, equivalent modifications and arrangements made based on the embodiments are covered within and the scope of the present invention. Therefore, the scope of the present invention should be accorded by the broadest interpretation of the appended claims of the application.

What is claimed is:

1. A motor controller for vehicle assist control, generating an assist torque command for a motor device to perform vehicle assist control according to an execution command of a vehicle assist determination unit as well as a rotor position signal and a rotor speed signal of the motor device, the motor controller comprising:
   a first consolidation unit, generating a position offset signal according to an original position signal and the rotor position signal of the motor device;
   a first gain unit, performing a position ratio calculation based on the position offset signal to generate a front-order torque command;
   a second gain unit, performing a speed ratio calculation based on the rotor speed signal to generate a torque damping command; and
   a second consolidation unit, generating the assist torque command according to the front-order torque command and the torque damping command used as negative feedback.

2. The motor controller according to claim 1, comprising:
   a threshold limiting unit, generating a speed adjustment signal according to a speed threshold and the rotor speed signal, the speed adjustment signal adapted to be input to the second gain unit for performing the speed ratio calculation to generate the torque damping instruction;
   wherein, when the rotor speed signal is positive, the threshold limiting unit is for setting the speed adjustment signal to zero when the rotor speed signal is smaller than the speed threshold, and for corresponding the speed adjustment signal to the rotor speed signal when the rotor speed signal is greater than the speed threshold;
   wherein, when the rotor speed signal is negative, the threshold limiting unit is for setting the speed adjustment signal to zero when the rotor speed signal is greater than the speed threshold in negative, and for corresponding the speed adjustment signal to the rotor speed signal when the rotor speed signal is smaller than speed threshold in negative.

3. The motor controller according to claim 1, wherein the first consolidation unit is for defining the rotor position signal currently received as the original position signal upon receiving the execution command, and for defining an offset between the original position signal and the rotor position signal subsequently received as the position offset signal.

4. A motor control method for vehicle assist control, for a motor device to perform vehicle assist control according to a rotor position signal and a rotor speed signal of the motor device; the motor control method comprising:

generating a position offset signal according to an original position signal and the rotor position signal of the motor device in response to an execution command issued by a vehicle assist determination unit;

performing a position ratio calculation based on the position offset signal to generate a front-order torque command;

performing a speed ratio calculation based on the rotor speed signal to generate a torque damping command; and generating an assist torque command according to the front-order torque command and the torque damping command used as negative feedback, wherein the assist torque command is provided to the motor device for performing vehicle assist control.

5. The motor control method according to claim 4, wherein in the step of generating the torque damping command, a speed adjustment signal is generated according to a speed threshold and the rotor speed signal, the speed adjustment signal for performing the speed ratio calculation to generate the torque damping command; wherein, when an absolute value of the rotor speed signal is smaller than the speed threshold, the speed adjustment signal is defined as zero, and when the absolute value of the rotor speed signal is greater than the speed threshold, the speed adjustment signal is defined as the rotor speed signal.

6. The motor control method according to claim 4, wherein in the step of generating the position offset signal, the rotor position signal currently received is defined as the original position signal upon receiving the execution command, and an offset between the original position signal and the rotor position signal subsequently received is defined as the position offset signal.

7. A non-transitory computer-readable medium, storing therein a computer program for controlling a motor device to perform assist control of a vehicle parking on a ramp; wherein, when the computer program is loaded by a computer, the motor control method for vehicle assist control of claim 4 is implemented according to an execution command of a vehicle assist determination unit as well as a rotor position signal and a rotor speed signal of the motor device.

* * * * *